(12) United States Patent
Yang et al.

(10) Patent No.: US 8,822,052 B2
(45) Date of Patent: Sep. 2, 2014

(54) BATTERY CARTRIDGE

(75) Inventors: Gwang Ho Yang, Incheon (KR); Yong Hyun Nam, Incheon (KR)

(73) Assignee: LG Electronics Inc., Seoul (KR)

(*) Notice: Subject to any disclaimer, the term of this patent is extended or adjusted under 35 U.S.C. 154(b) by 7 days.

(21) Appl. No.: 13/512,249

(22) PCT Filed: Nov. 1, 2010
(Under 37 CFR 1.47)

(86) PCT No.: PCT/KR2010/007576
§ 371 (c)(1),
(2), (4) Date: Sep. 12, 2012

(87) PCT Pub. No.: WO2011/065674
PCT Pub. Date: Jun. 3, 2011

(65) Prior Publication Data
US 2013/0177790 A1    Jul. 11, 2013

(30) Foreign Application Priority Data

Nov. 27, 2009   (KR) .................. 10-2009-0116066
Apr. 19, 2010   (KR) .................. 10-2010-0035990

(51) Int. Cl.
| H01M 10/50 | (2006.01) |
| H01M 10/00 | (2006.01) |
| H01M 2/30  | (2006.01) |
| H01M 2/10  | (2006.01) |
| B60L 11/18 | (2006.01) |
| H01M 2/20  | (2006.01) |

(52) U.S. Cl.
CPC ...... *H01M 10/5004* (2013.01); *H01M 10/5016* (2013.01); *H01M 10/5055* (2013.01); *H01M 10/00* (2013.01); *Y02T 10/705* (2013.01); *H01M 2/30* (2013.01); *Y02E 60/12* (2013.01); *H01M 2/1083* (2013.01); *H01M 10/5032* (2013.01); *B60L 11/1879* (2013.01); *H01M 10/5059* (2013.01); *Y02T 10/7005* (2013.01); *H01M 2/206* (2013.01); *H01M 2/1077* (2013.01); *H01M 10/5046* (2013.01)
USPC .............................. 429/72; 429/120; 429/99

(58) Field of Classification Search
CPC ...................................................... H01M 2/106
See application file for complete search history.

(56) References Cited

U.S. PATENT DOCUMENTS

| 6,482,542 B1* | 11/2002 | Takaki et al. ................ 429/120 |
| 2004/0079714 A1* | 4/2004 | Andrew et al. ............. 211/49.1 |
| 2006/0214631 A1* | 9/2006 | Yoon et al. .................... 320/112 |

(Continued)

FOREIGN PATENT DOCUMENTS

| KR | 10-2006-0090469 A | 8/2006 |
| KR | 10-2007-0112489 A | 11/2007 |

(Continued)

*Primary Examiner* — Patrick Ryan
*Assistant Examiner* — Haixia Zhang
(74) *Attorney, Agent, or Firm* — McKenna Long & Aldridge LLP

(57) ABSTRACT

The present invention relates to a battery cartridge which can be freely arranged and configured, and which has superior performance for protection, insulation and heat dissipation of unit battery cells. The battery cartridge according to an embodiment of the present invention comprises a plurality of unit cells generating current; a cover contacting one surface of the plurality of unit cells to dissipate heat; and an inner cartridge member disposed between an edge of the plurality of unit cells and the cover.

9 Claims, 14 Drawing Sheets

(56) References Cited

U.S. PATENT DOCUMENTS

2007/0231682 A1* 10/2007 Aoyama et al. ............... 429/160
2009/0325059 A1* 12/2009 Niedzwiecki et al. ........ 429/152
2010/0136420 A1* 6/2010 Shin et al. ..................... 429/178
2011/0059345 A1* 3/2011 Kim et al. ..................... 429/120

FOREIGN PATENT DOCUMENTS

| KR | 10-2007-0112490 A | 11/2007 |
| KR | 10-2009-0010393 A | 1/2009 |
| KR | 10-2009-0093222 A | 9/2009 |

* cited by examiner

BATTERY CARTRIDGE

TECHNICAL FIELD

The present invention relates to a battery cartridge, and more particularly to a battery cartridge capable of achieving free arrangement and configuration thereof while securing protection and insulation of unit cells thereof and exhibiting superior heat dissipation.

BACKGROUND ART

One serious problem encountered in vehicles using fossil fuels such as gasoline or light oil is air pollution. As a measure to solve such a problem, a technology for using re-chargeable secondary cells as a power source for vehicles is receiving attention. Thus, an electric vehicle (EV), which can be driven only using a battery, a hybrid electric vehicle (HEV), which uses a battery in combination with a conventional combustion engine, or the like has been developed, and is commercially available. For secondary cells as a power source of EVs, HEVs, or the like, nickel metal hydride (Ni-MH) cells are mainly used. Recently, use of lithium ion cells has also been attempted.

In order to be used as a power source of EVs, HEVs, or the like, the cells should have high power and large capacity. To this end, a medium or large cell pack having a structure, in which a plurality of small secondary cells (unit cells) is connected in series and/or in parallel, is used.

Since unit cells, which are constituent elements of the medium or large cell pack, are stacked at high density, a prismatic cell or a pouch type cell, which is capable of reducing the size of a dead space, is used as such a unit cell. In order to achieve easy mechanical fastening and easy electrical connection of unit cells as mentioned above, a battery cartridge capable of mounting one unit cell or two or more unit cells is generally used. That is, a plurality of battery cartridges, in which unit cells are mounted, is stacked to form a cell pack.

Such battery cartridges require protection, insulation, and heat dissipation of internal unit cells thereof. Also, free stacking and configuration of battery cartridges are required.

DISCLOSURE

Technical Problem

It is an object of the present invention to provide a battery cartridge capable of achieving free arrangement and configuration thereof.

It is another object of the present invention to provide a battery cartridge capable of securing superior protection, insulation and heat dissipation of unit cells thereof.

The objects of the present invention are not limited to the above-described objects, and other objects not described will be more clearly understood by those skilled in the art from the following description.

Technical Solution

In accordance with an aspect of the present invention, the above and other objects can be accomplished by the provision of a battery cartridge including a plurality of unit cells generating current; a cover contacting one surface of the plurality of unit cells to dissipate heat; and an inner cartridge member disposed between an edge of the plurality of unit cells and the cover.

Detailed matters of other embodiments are included in the detailed description and the drawings.

Advantageous Effects

In accordance with the battery cartridge of the present invention, there are one or more effects as follows.

First, there is an advantage in that, since the battery cartridges can be freely arranged, they can be variously connected.

Second, there is an advantage in that the battery cartridges are freely arranged in horizontal and vertical directions.

Third, there is an advantage in that efficient air cooling for unit cells is possible.

Fourth, there is an advantage in that sealing and insulation of unit cells are secured.

Fifth, when the battery cartridges are stacked such that they are cooled in an air cooling manner, air flows between the ventilation ridges. Accordingly, heat from the covers is outwardly dissipated.

Sixth, in a state in which the battery cartridges are stacked, the ventilation ridges provided at the covers also function to maintain a clearance between adjacent ones of the battery cartridges so as to cope with expansion of unit cells during charge and discharge.

Seventh, when at least two battery cartridges are stacked such that the ventilation ridges of adjacent ones of the battery cartridges come into contact with each other, a clearance is formed between adjacent battery cartridges. As air flows through the clearance, the battery cartridges are cooled.

Eighth, uniform cooling of the upper cover and lower cover is achieved because the ventilation ridges formed at the upper cover and lower cover to dissipate heat from the covers have the same shape.

Ninth, when the battery cartridges are stacked such that the ventilation ridges respectively formed at the upper cover and lower cover contact each other, the clearance formed between the upper cover and the lower cover is maintained at a constant height.

Tenth, air flows through passages defined in accordance with contact of facing ventilation ridges formed in parallel, thereby cooling the battery cartridge.

Eleventh, since the upper cover and lower cover have the same shape, the battery cartridges have the same outer appearance. Also, it is unnecessary to manufacture the upper cover and lower cover in a separate manner. As a result, it may be possible to reduce manufacturing costs and to achieve easy and convenient management.

Twelfth, convex portions and concave portions are formed at the outer surfaces of the covers such that they correspond to each other. The convex portions and concave portions guide the corresponding battery cartridges to coupling positions during stacking of the battery cartridges. The convex portions and concave portions also enable not only normal stacking, in which battery cartridges are stacked in the same direction, but also inverted stacking, in which battery cartridges are stacked in an inverted manner.

Effects of the present invention are not limited to the above-described effects. Other effects not described can be clearly understood by those skilled in the art from the description of the claims.

DESCRIPTION OF DRAWINGS

The above and other objects, features and other advantages of the present invention will be more clearly understood from the following detailed description taken in conjunction with the accompanying drawings, in which.

BEST MODE

Figure 1:
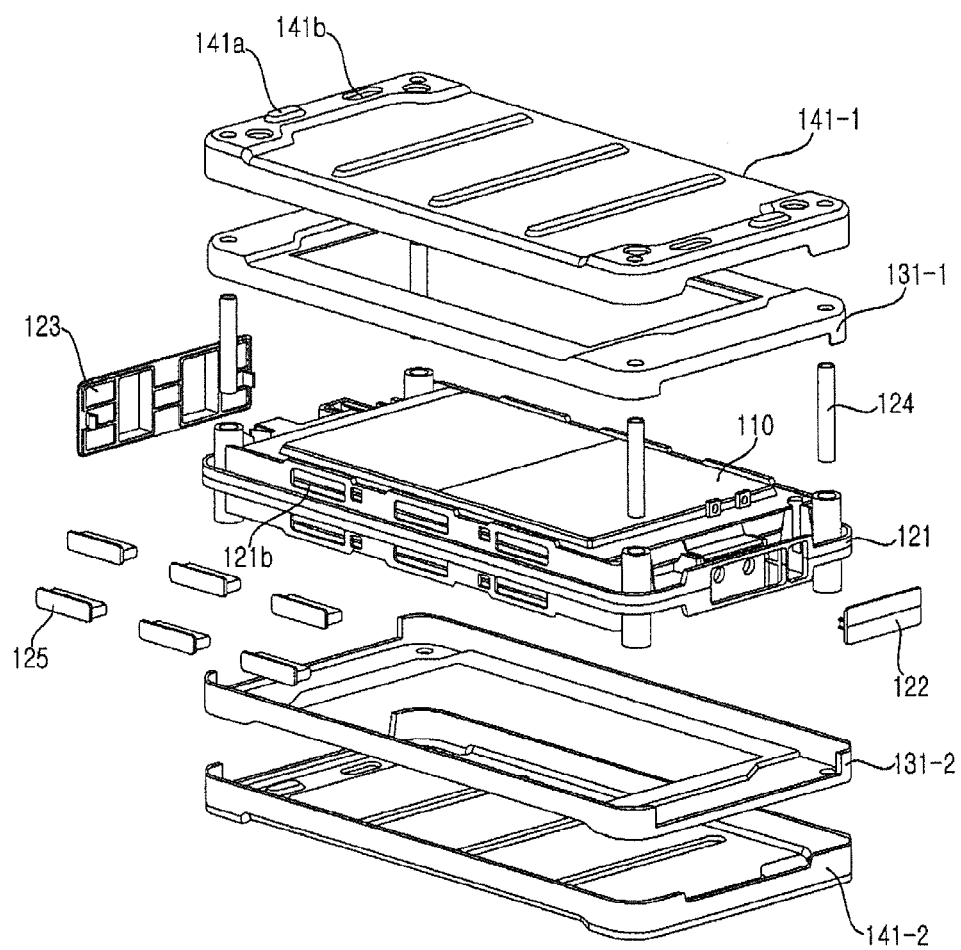
FIG. 1 is an exploded perspective view of a battery cartridge according to an embodiment of the present invention.
Figure 2:
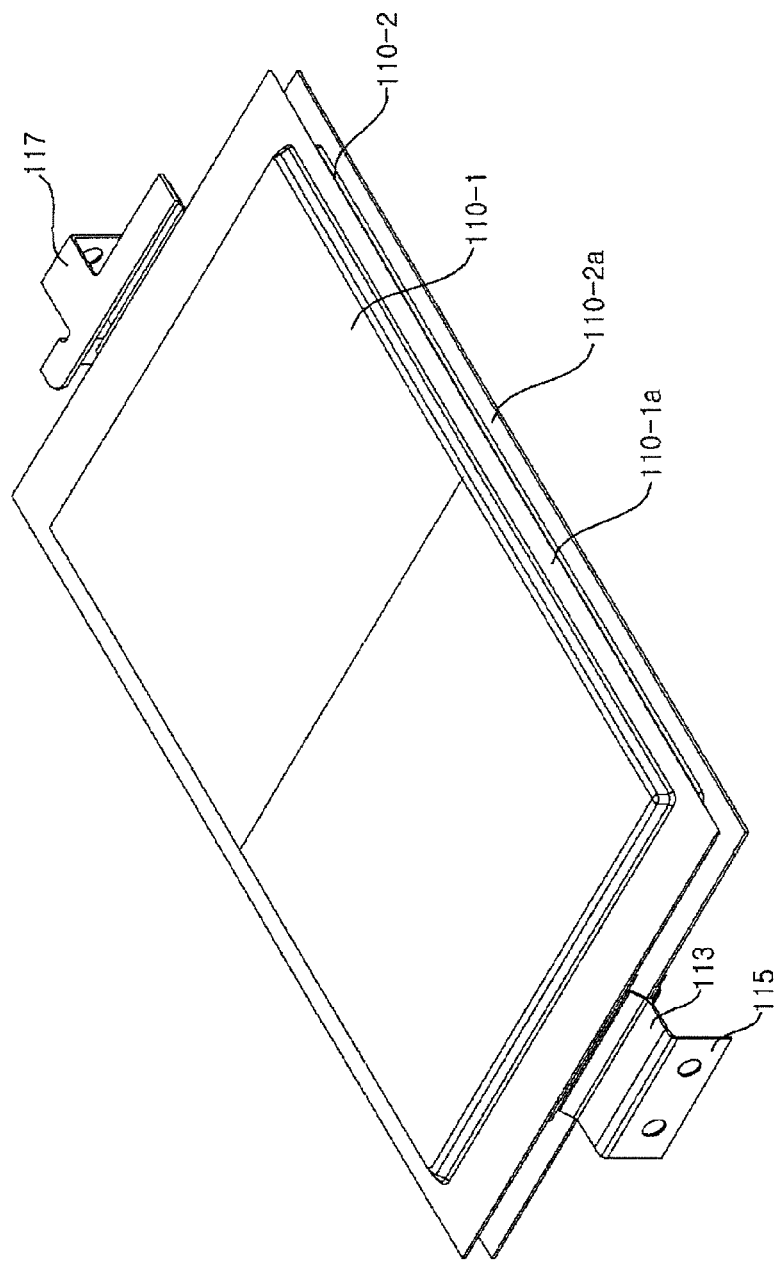
FIGS. 2 to 5 are views illustrating unit cells of a battery cartridge according to an embodiment of the present invention.
Figure 3:
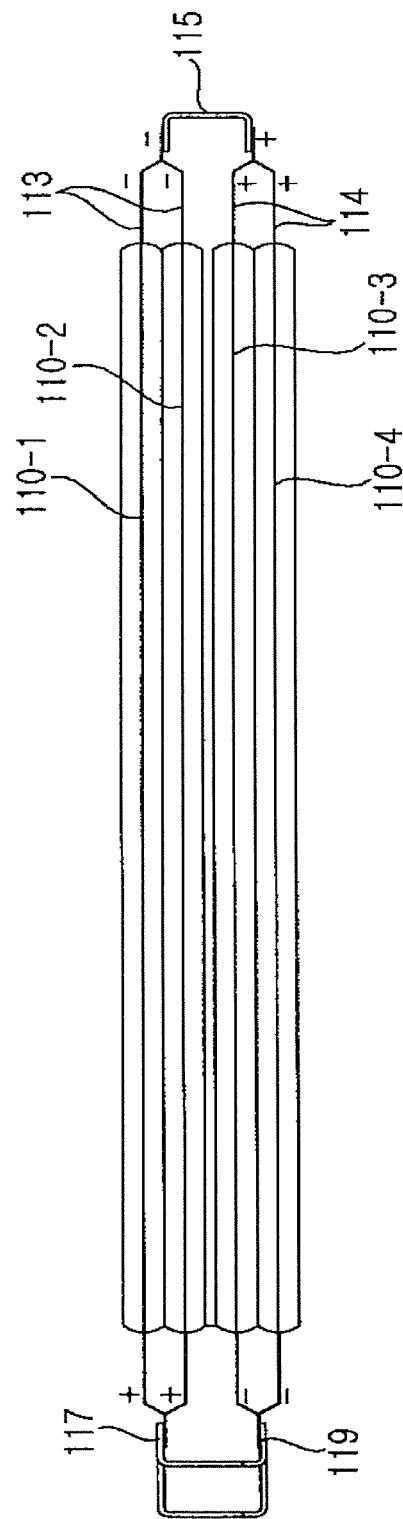
Figure 4:
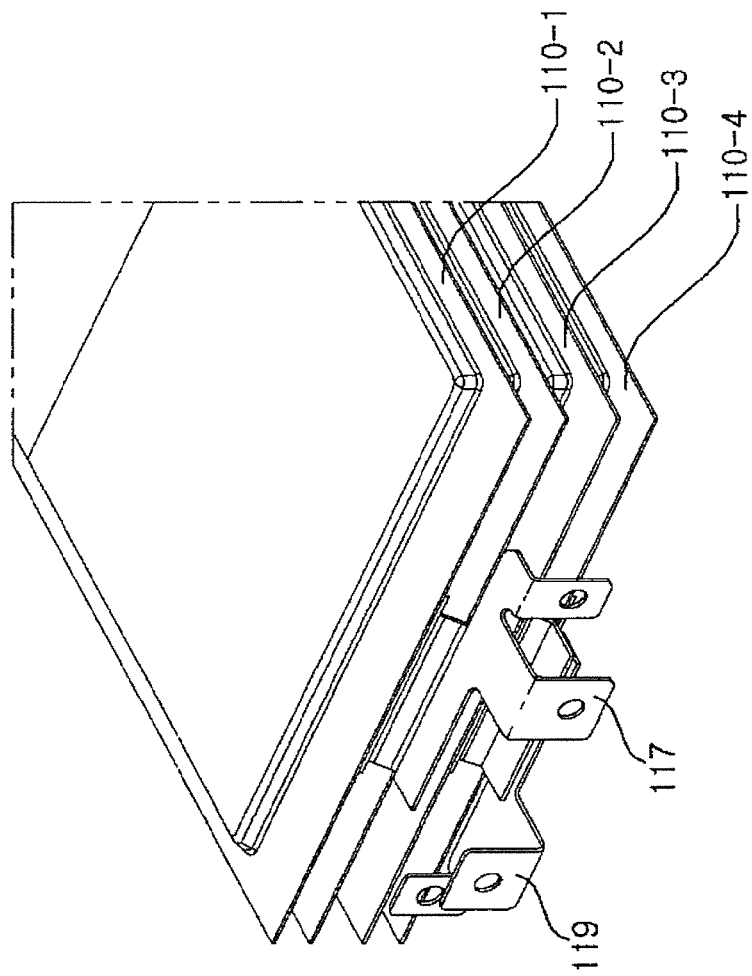
Figure 5:
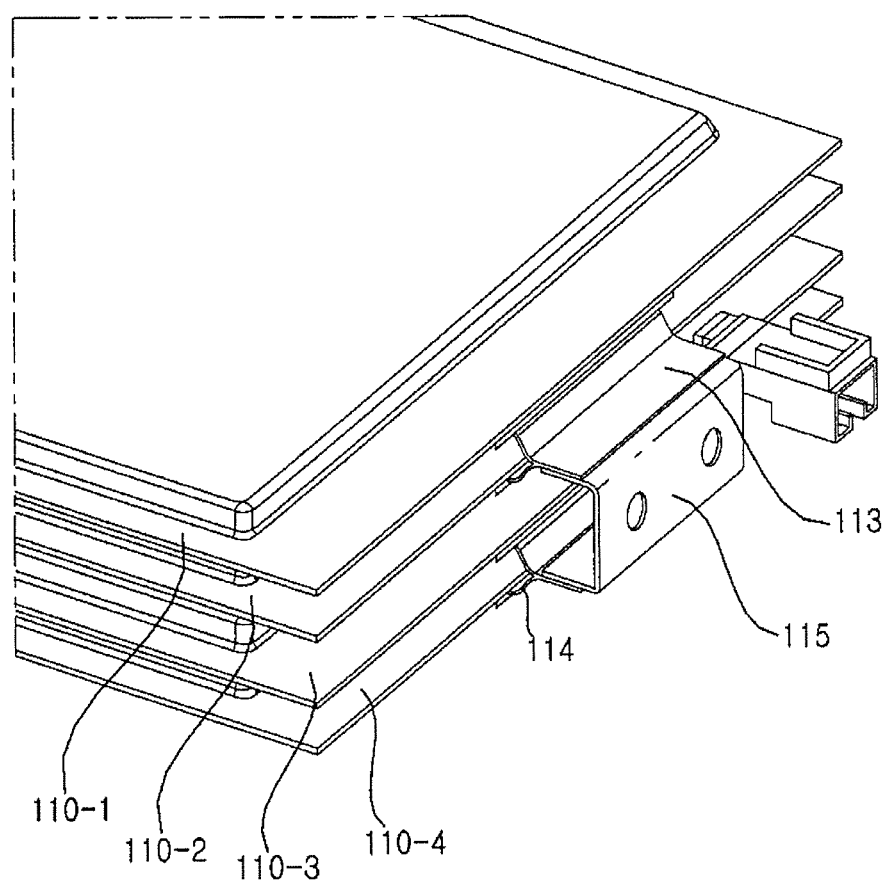

Referring to embodiments of the present invention described hereinafter in detail with reference to the accompanying drawings, advantages and features of the present invention and methods for accomplishing the same will be clarified. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Hereinafter, the present invention will be described with reference to the drawings for explaining battery cartridges according to embodiments of the present invention.

FIG. 1 is an exploded perspective view of a battery cartridge according to an embodiment of the present invention.

The battery cartridge according to the illustrated embodiment of the present invention includes a plurality of unit cells 110, an upper cartridge member 131-1, a lower cartridge member 131-2, a central cartridge member 121, and a cover 141-1/141-2.

Each of the plurality of unit cells 110 is a bundle of unit cells. Each unit cell is a nickel metal hydride (Ni-MH) cell or a lithium ion cell, which generates current. The plurality of unit cells 110 are disposed in the central cartridge member 121. The upper cartridge member 131-1 closely contacts the peripheral edge of the top of the plurality of unit cells 110. The upper cover 141-1, which will be described later, closely contacts the inner portion of the top of the plurality of unit cells 110. The lower cartridge member 131-2 closely contacts the peripheral edge of the bottom of the plurality of unit cells 110. The lower cover 141-2, which will be described later, closely contacts the inner portion of the bottom of the plurality of unit cells 110.

The cover 141-1/141-2 may include the upper cover 141-1 and/or the lower cover 141-2. The upper cover 141-1 is disposed at the top of the battery cartridge, and the lower cover 141 is disposed at the bottom of the battery cartridge.

The upper cover 141-1 contacts the top of the plurality of unit cells 110, to dissipate heat generated from the plurality of unit cells 110. Preferably, the upper cover 141-1 is made of aluminum having superior heat dissipation ability. The upper cartridge member 131-1 is disposed between the upper cover 141-1 and the plurality of unit cells 110.

The upper cartridge member 131-1 contacts the top edge of the plurality of unit cells 110. The upper cartridge member 131-1 prevents the top edge of the plurality of unit cells 110 from coming into direct contact with the upper cover 141-1, to provide insulation. The upper cartridge member 131-1 supports the top edge of the plurality of unit cells 110 between the plurality of unit cells 110 and the upper cover 141-1, to protect the top edge of the plurality of unit cells 110. The lower cover 141-2 is formed to have the same structure as the upper cover 141-1. When the upper cover 141-1 is coupled to the bottom of the battery cartridge, it becomes the lower cover 141-2. Since the upper cover 141-1 and lower cover 141-2 have the same structure, the battery cartridge has a constant outer structure. Also, it is unnecessary to manufacture the upper cover 141-1 and lower cover 141-2 in a separate manner. As a result, it may be possible to reduce manufacturing costs and to achieve easy and convenient management. Also, uniform cooling effects are provided by ventilation ridges in a stacked structure, which will be described later.

Description of the lower cover 141-2 and lower cartridge member 131-2 is identical to the description of the upper cover 141-1 and upper cartridge member 131-1. Accordingly, no detailed description will be given of the lower cover 141-2 and lower cartridge member 131-2.

Each of the upper cover 141-1 and lower cover 141-2 is formed with convex portions 141a protruded from an outer surface of the cover, and concave portions 141b recessed from the outer surface of the cover. When battery cartridges are stacked, coupling between the convex portions 141a and the concave portions 141b is achieved between the stacked battery cartridges, to provide alignment of the stacked battery cartridges. The convex portions 141a and concave portions 141b are symmetrically formed at four corners of the top of the upper cover 141-1. Accordingly, it may be possible to achieve normal stacking, in which battery cartridges are stacked in the same direction, and inverted stacking, in which battery cartridges are stacked in an inverted manner.

Figure 7:
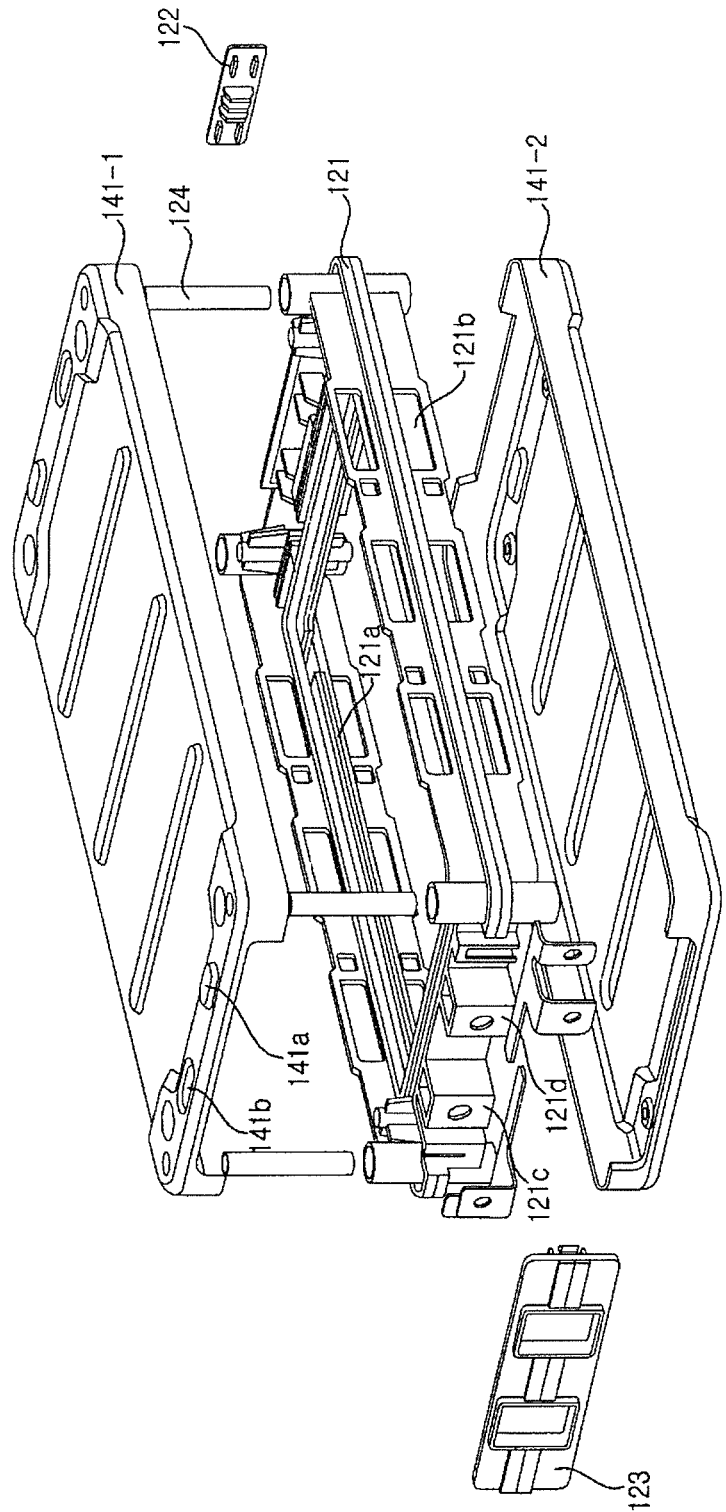
FIG. 7 is an exploded perspective view partially illustrating the battery cartridge according to the illustrated embodiment of the present invention.

In detail, the upper cover 141-1 and lower cover 141-2 are formed to have the same structure. Also, the convex portions 141a and concave portions 141b of the upper cover 141-1 and lower cover 141-2 are formed at corresponding positions at which the convex portions 141a and concave portions 141b are coupled when the upper cover 141-1 and lower cover 141-2 face each other. Since the convex portions 141a and concave portions 141b of the upper cover 141-1 and lower cover 141-2 are formed at corresponding positions, they guide the battery cartridges to set the coupling positions of battery cartridges during stacking of the battery cartridges carried out in such a manner that the lower cover 141-2 of the uppermost one of the battery cartridges is coupled with the upper cover 141-1 of the battery cartridge stacked just beneath the uppermost battery cartridge 110. Stacking of battery cartridges is illustrated in FIG. 7.

The plurality of unit cells 110 are disposed in the central cartridge member 121. The upper cover 141-1 is coupled to the top of the central cartridge member 121 such that the upper cartridge member 131-1 is interposed between the upper cover 141-1 and the central cartridge member 121. The lower cover 141-2 is coupled to the bottom of the central cartridge member 121 such that the lower cartridge member 131-2 is interposed between the lower cover 141-2 and the central cartridge member 121. For coupling, various coupling methods such as bonding, bolt fastening, and welding may be used.

Spacers 124 are provided at the central cartridge member 121. The spacers 124 support the upper cartridge member 131-1, upper cover 141-1, lower cartridge member 131-2 and lower cover 141-2. When battery cartridges are coupled in a stacked manner, the long bolts 400, which will be described later, pass through the spacers 124.

Side holes 121b are formed at the central cartridge member 121. Cartridge supports 125 are inserted into the side holes 121b, respectively. The cartridge supports 125 support the edges of the plurality of unit cells 110 between adjacent ones of the unit cells 110, to protect the edges of the unit cells 110.

A front cover 123 is coupled to a front surface of the central cartridge member 121. A rear cover 122 is also coupled to a rear surface of the central cartridge member 121. Thus, the front cover 123 and rear cover 122 protect terminals of the plurality of unit cells 110.

FIGS. 2 to 5 are views illustrating unit cells of a battery cartridge according to an embodiment of the present invention.

The plurality of unit cells 110 preferably include four unit cells, namely, first to fourth unit cells 110-1 to 110-4. Of course, the number of unit cells may be varied in accordance with the structure of the unit cells.

The first unit cell 110-1 and second unit cell 110-2 are coupled in a close contact state, and the third unit cell 110-3 and fourth unit cell 110-4 are coupled in a close contact state. A gap is formed between the second unit cell 110-2 and the third unit cell 110-3. The gap between the second unit cell 110-2 and the third unit cell 110-3 is defined by the central cartridge member 121. Since there is a gap between the second unit cell 110-2 and the third unit cell 110-3, it may be possible to cope with expansion of the unit cells during charge and discharge. A thermal sensor (not shown) may be disposed in the gap between the second unit cell 110-2 and the third unit cell 110-3.

A first unit cell sealing portion 110-1a is provided at the first unit cell 110-1, as a portion for sealing the edge of the first unit cell 110-1. When the first unit cell sealing portion 110-1a is torn or broken, a cell solution may leak, thereby causing electrical conduction. Accordingly, the first unit cell sealing portion 110-1a closely contacts the upper cartridge member 131-1 in order to secure insulation and protection of the first unit cell sealing portion 110-1a.

A cartridge support 125 is inserted between the first unit cell sealing portion 110-1a and a second unit cell sealing portion 110-2a, to support the sealing portions while protecting and insulating the sealing portions. The first unit cell sealing portion 110-1a and a second unit cell sealing portion 110-2a may contact the upper cartridge member 131-1 due to loosening thereof caused by weights thereof when the battery cartridge is in the upright position. In the contact state, the first unit cell sealing portion 110-1a and a second unit cell sealing portion 110-2a may be partially torn or broken due to vibration or the like of a vehicle. In this case, the cartridge support 125 supports each sealing portion to prevent electrical conduction caused by cell solution leakage due to partial tearing or breakage of the sealing portion.

The plurality of unit cells 110 are provided with a parallel positive electrode terminal 117, a parallel negative electrode terminal 119, parallel negative electrodes 113, parallel positive electrodes 114, and a serial electrode 115.

The parallel positive electrode terminal 117 connects the first unit cell 110-1 and second unit cell 110-2 in parallel, to form an anode of the plurality of unit cells 110. The parallel positive electrode terminal 117 is disposed at one side of the plurality of unit cells 110. The parallel negative electrode terminal 119 connects the third unit cell 110-3 and fourth unit cell 110-4 in parallel, to form a cathode of the plurality of unit cells 110. The parallel negative electrode terminal 119 is disposed at one side of the plurality of unit cells 110 in parallel with the parallel positive electrode terminal 117.

The parallel negative electrodes 113 connect the first unit cell 110-1 and second unit cell 110-2 in parallel. The parallel positive electrodes 114 connect the third unit cell 110-3 and fourth unit cell 110-4 in parallel. The serial electrode 115 connects the parallel negative electrodes 113 and parallel positive electrodes 114.

The first unit cell 110-1 and second unit cell 110-2 are connected in parallel, and the third unit cell 110-3 and fourth unit cell 110-4 are connected in parallel. The two sets of parallel-connected unit cells are then connected in series. Thus, the plurality of unit cells 110 are connected to form a dual-parallel/dual-serial connection structure. Of course, the connection structure may be varied in accordance with a required voltage and a required capacity.

Figure 6:
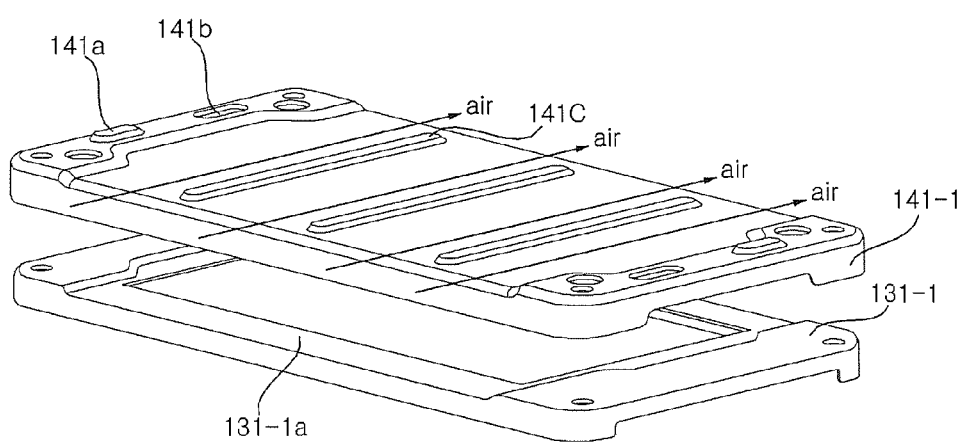
FIG. 6 is an exploded perspective view partially illustrating the battery cartridge according to the illustrated embodiment of the present invention.

FIG. 6 is an exploded perspective view partially illustrating the battery cartridge according to the illustrated embodiment of the present invention.

A plurality of unit cells 110 contacts an inner surface of the cover 141-1/142-2, which includes an upper cover 141-1 and a lower cover 141-2. The following description will be given in conjunction with the case in which the cover 141-1/142-2, which includes the upper cover 141-1 and lower cover 141-2. The plurality of unit cells 110, which contact the cover 141-1/141-2, transfer heat to the cover 141-1/142-2. The heat, which is generated from the plurality of unit cells 110 and is transferred to the cover 141-1/142-2, is partially transferred to the atmosphere at the outer surface of the cover 141-1/142-2.

Heat is outwardly dissipated by a plurality of ventilation ridges 141c formed at the cover 141-1/142-2. The ventilation ridges 141c are formed to protrude from the outer surface of the cover 141-1/142-2, as described above. In the case in which battery cartridges are stacked such that they are cooled in an air cooling manner, air flows among the ventilation ridges 141c. Accordingly, heat from the cover 141-1/142-2 is outwardly dissipated.

The ventilation ridges 141c may be formed on the top surface of the cover 141-1 in a longitudinal direction or in a lateral direction in accordance with a flow direction of air. Embodiments of the ventilation ridges 141c will be described in conjunction with FIG. 11, along with FIG. 6.

In the case in which battery cartridges are stacked, the ventilation ridges 141c also function to maintain a gap between adjacent ones of the battery cartridges so as to cope with expansion of unit cells during charge and discharge.

The upper cartridge member 131-1 is formed with a contact surface 131-1a to closely contact the first unit cell sealing portion 110-1a.

FIG. 7 is an exploded perspective view partially illustrating the battery cartridge according to the illustrated embodiment of the present invention.

The central cartridge member 121 is coupled between the second unit cell 110-2 and the third unit cell 110-3 while defining a gap, namely, a central gap 121a. The central cartridge member 121 is formed, at a front surface thereof, with a positive electrode member 121c, on which the parallel positive electrode terminal 117 is seated, and a negative electrode member 121d, on which the parallel negative electrode terminal 119 is seated.

Figure 8:
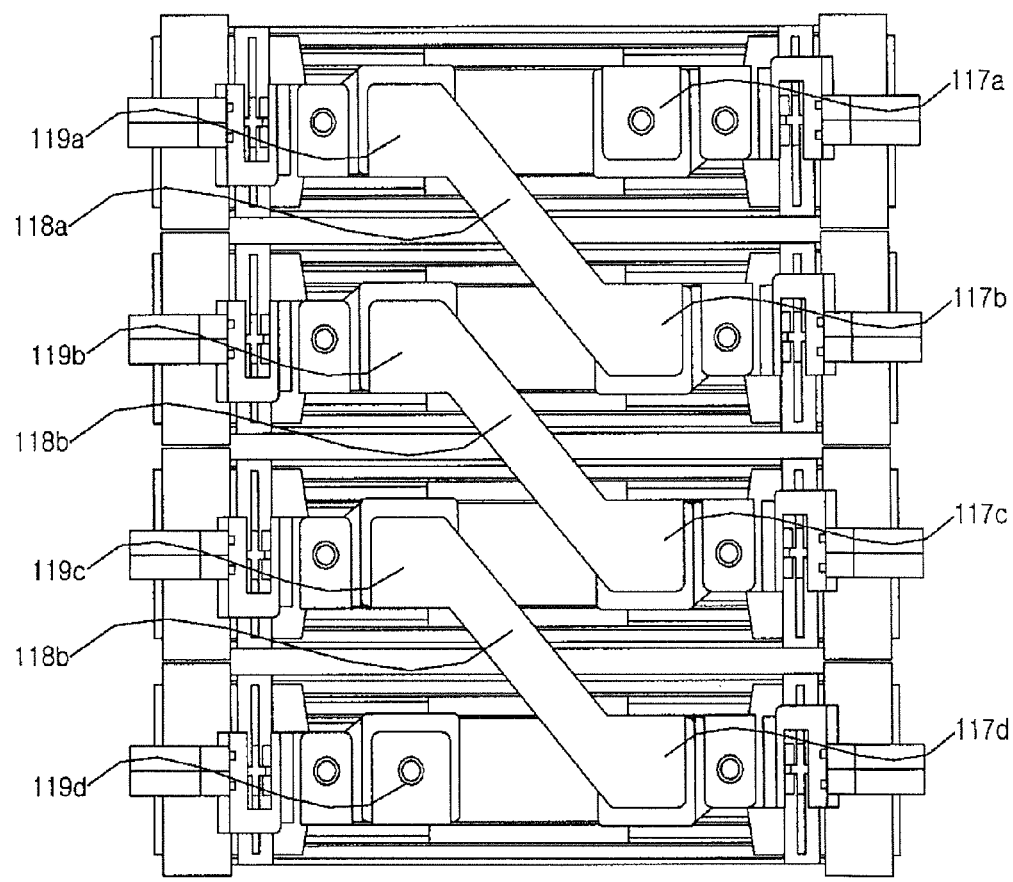
FIG. 8 is a view illustrating normal stacking of battery cartridges according to an embodiment of the present invention.

FIG. 8 is a view illustrating normal stacking of battery cartridges according to an embodiment of the present invention.

A plurality of battery cartridges is stacked in the same direction such that parallel negative electrode terminals 119a to 119d are aligned, and parallel positive electrode terminals 117a to 117d are aligned. The first parallel negative electrode terminal 119a is connected with the second parallel positive electrode terminal 117b diagonally arranged with respect to the first parallel negative electrode terminal 119a by a first connector 118a. The second parallel negative electrode terminal 119b is connected with the third parallel positive electrode terminal 117c diagonally arranged with respect to the second parallel negative electrode terminal 119b by a second connector 118b.

The third parallel negative electrode terminal 119c is connected with the fourth parallel positive electrode terminal 117d diagonally arranged with respect to the third parallel negative electrode terminal 119c by a third connector 118c. The battery cartridges may be stacked in a normal direction such that the first parallel positive electrode terminal 117a and fourth parallel negative electrode terminal 119d are arranged on different columns.

Figure 9:
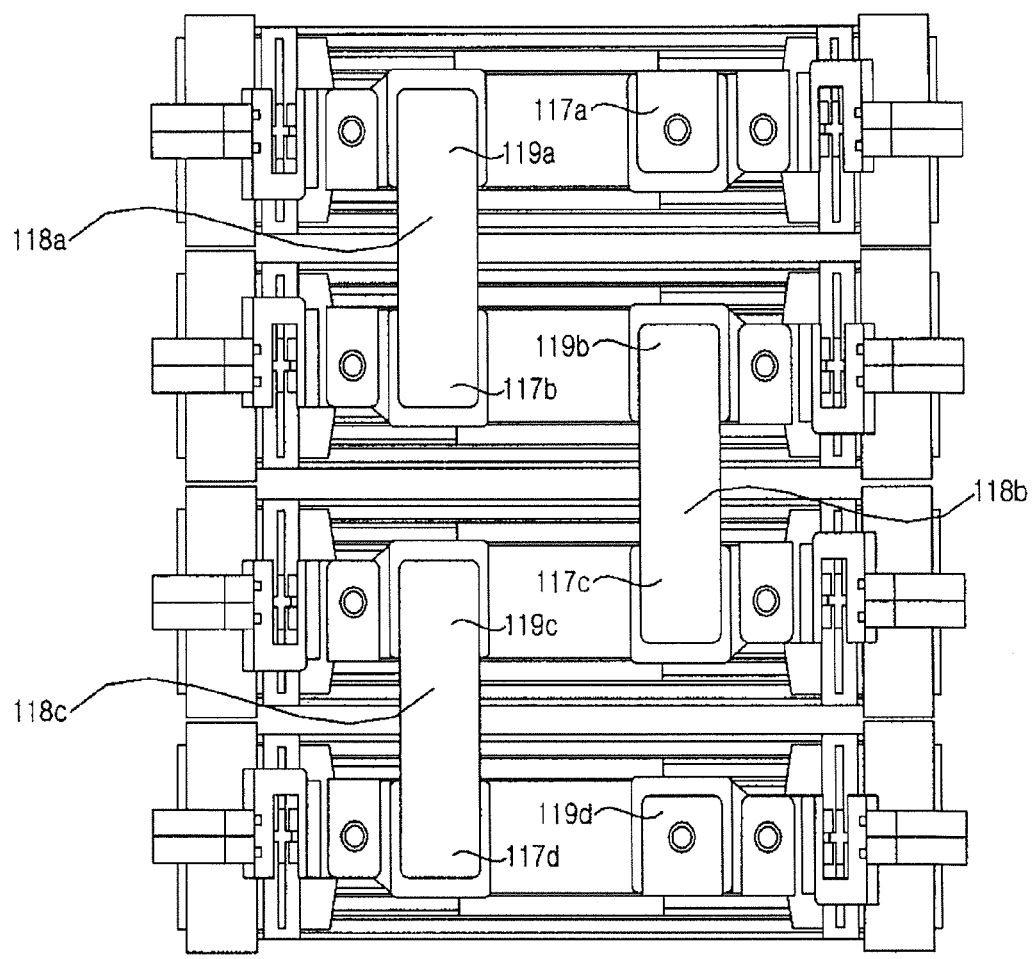
FIG. 9 is a view illustrating inverted stacking of battery cartridges according to an embodiment of the present invention.

FIG. 9 is a view illustrating inverted stacking of battery cartridges according to an embodiment of the present invention.

A plurality of battery cartridges is stacked in different directions such that parallel negative electrode terminals 119a to 119d alternate with one another, and parallel positive electrode terminals 117a to 117d alternate with one another. The first parallel negative electrode terminal 119a is connected with the second parallel positive electrode terminal 117b arranged on the same column as the first parallel negative electrode terminal 119a by a first connector 118a. The second parallel negative electrode terminal 119b is connected with the third parallel positive electrode terminal 117c arranged on the same column as the second parallel negative electrode terminal 119b by a second connector 118b.

The third parallel negative electrode terminal 119c is connected with the fourth parallel positive electrode terminal 117d arranged on the same column as the third parallel negative electrode terminal 119c by a third connector 118c. The battery cartridges may be stacked in an inverted direction such that the first parallel positive electrode terminal 117a and fourth parallel negative electrode terminal 119d are arranged on the same column.

A plurality of battery cartridges can be diversely arranged and bound because they can be stacked in either the normal direction or the inverted direction.

Figure 10:
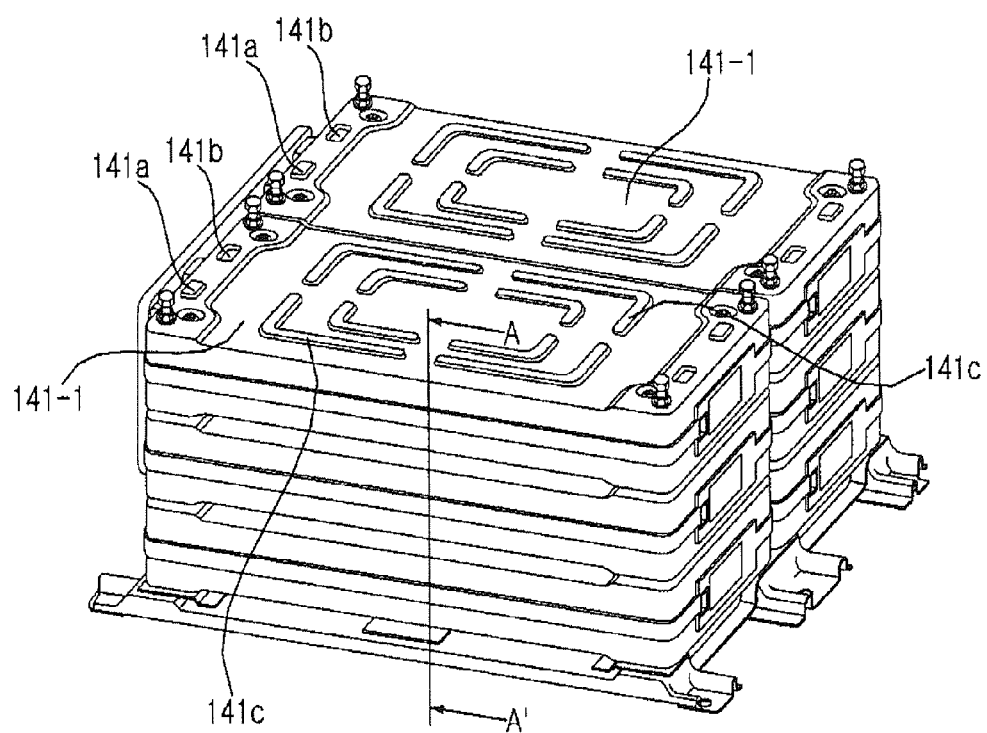
FIG. 10 is a view illustrating a stacked state of battery cartridges according to an embodiment of the present invention.
Figure 11:
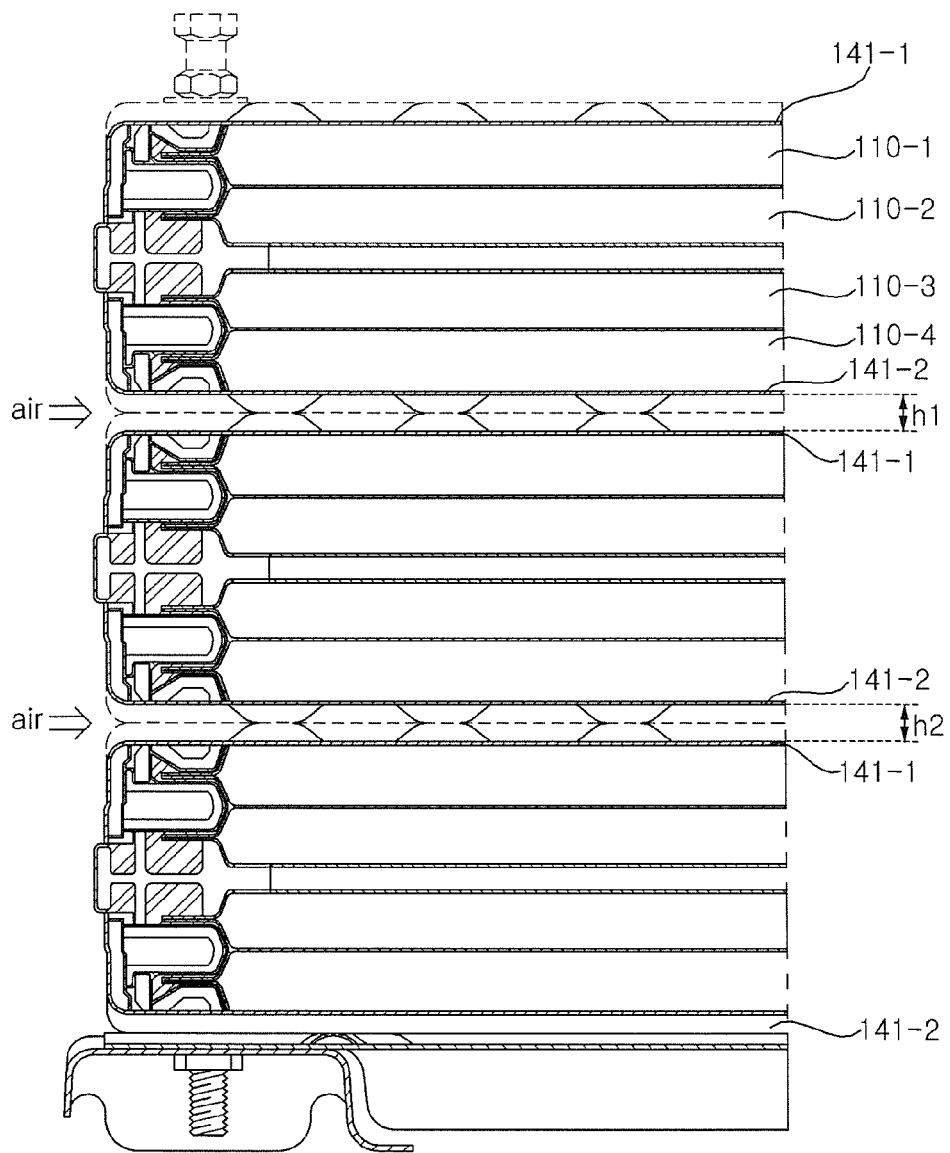
FIG. 11 is a cross-sectional view taken along the line A-A' in FIG. 10.

FIG. 10 is a view illustrating a stacked state of battery cartridges according to an embodiment of the present invention. FIG. 11 is a cross-sectional view taken along the line A-A' in FIG. 7.

Referring to FIGS. 10 and 11, when at least two battery cartridges, each of which includes the cover 141-1/141-2 in accordance with the illustrated embodiment of the present invention, are stacked such that ventilation ridges 141c of adjacent ones of the battery cartridges come into contact with each other, a clearance h1 or h2 is formed between the adjacent battery cartridges. As air flows through the clearance h1 or h2, the battery cartridges are cooled.

The cover 141-1/141-2 is provided at each of the top and bottom of each battery cartridge, as described above. Thus, the cover 141-1/141-2 includes the upper cover 141-1 and lower cover 141-2.

When at least two battery cartridges, each of which includes the cover 141-1/141-2, are coupled, coupling is achieved in such a manner that the lower cover 141-2 of the uppermost one of the battery cartridges is coupled with the upper cover 141-1 of the battery cartridge stacked just beneath the uppermost battery cartridge while being guided by convex portions and concave portions.

The ventilation ridges 141c formed at the lower cover 141-2 contact the ventilation ridges 141c formed at the upper cover 141-1 arranged on the layer just beneath the lower cover 141-2. In accordance with contact between the ventilation ridges 141c, the clearance h1 or h2, which has a certain height, is formed between the battery cartridges.

As air flows through the clearance h1 or h2, heat from plural unit cells transferred to the covers is transferred to the air via the ventilation ridges 141c. As air flows while receiving heat, the covers 141-1/141-2 are cooled. In accordance with cooling of the covers 141-1/141-2, the battery cartridges are cooled.

In the case of conventional covers, cooling of upper and lower covers is non-uniform because the upper and lower covers have different shapes. Furthermore, separate ventilation ridges such as the ventilation ridges 141c are not provided. For this reason, there is a problem associated with heat dissipation. In the battery cartridge of the present invention, however, the upper cover 141-1 and lower cover 141-2 have the same shape, and the ventilation ridges 141c, which are formed at the covers 141-1/141-2 to dissipate heat from the covers 141-1/141-2, have the same shape. Accordingly, cooling of the upper cover 141-1 and lower cover 141-2 is uniformly carried out.

Also, since the ventilation ridges 141c formed at the upper cover 141-1 and lower cover 141-2 have the same shape, the clearances h1 or h2 formed when the battery cartridges are stacked such that the ventilation ridges 141c contact each other have a constant height. As the clearances h1 or h2, through which cooling is carried out, have a constant height, uniform cooling of the battery cartridges is achieved.

The battery cartridges may be stacked in a vertical direction or may be arranged on a wide horizontal plane. Alternatively, the battery cartridges may be stacked in vertical and horizontal directions. In either case, the heights and positions of the clearances h1 or h2 are constant because the covers 141-1/141-2 included in the battery cartridges have the same shape, and the ventilation ridges 141c of the covers 141-1/141-2 have the same shape. Accordingly, effects of cooling the stacked battery cartridges are uniform.

Figure 12:
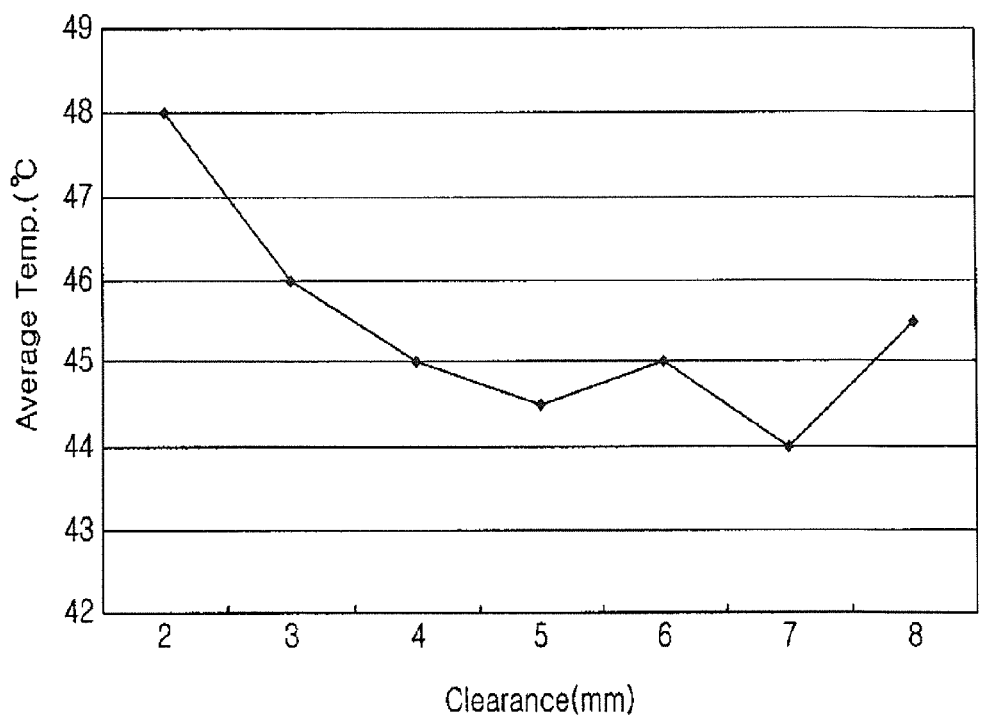
FIGS. 12 and 13 depict experimental results obtained from an experiment to determine cooling effects of the battery cartridges depending upon the heights of the clearances shown in FIG. 8.
Figure 13:
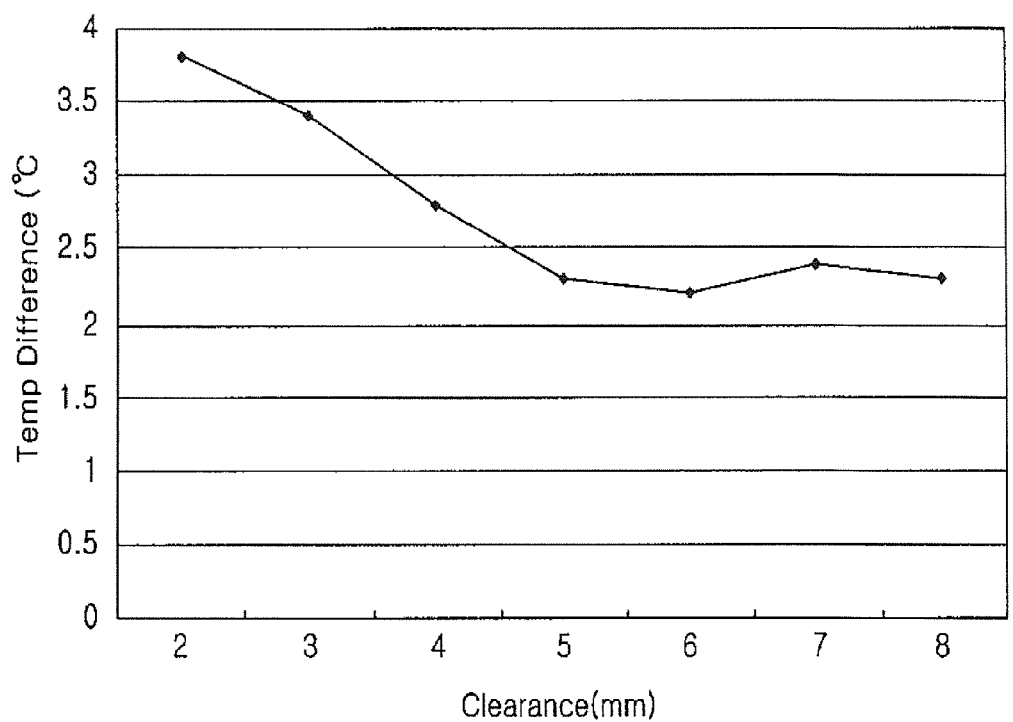

FIGS. 12 and 13 depict experimental results obtained from an experiment to determine cooling effects of the battery cartridges depending upon the heights of the clearances shown in FIG. 11.

Referring to FIGS. 12 and 13, it can be seen that, when the clearances h1 or h2 cooling the covers have a height of 5 mm or more, enhanced cooling effects are obtained, as compared to the case of less than 5 mm. That is, although cooling effects are provided by virtue of formation of the clearances h1 or h2, such cooling effects are varied in accordance with the height of the clearances h1 or h2.

In the experiment to evaluate cooling effects, the initial temperature of the battery cartridges to be cooled is 55° C., the temperature of air supplied to the clearances h1 or h2 is 30° C., and supply of air is continued for 3 minutes. Referring to FIG. 9, the results of the experiment can be seen. That is, when the height of the clearances h1 or h2 is 2 mm, the temperature of the battery cartridges becomes 48° C. As the height of the clearances h1 or h2 gradually increases, the temperature of the battery cartridges is gradually reduced. When the height of the clearances h1 or h2 is 5 mm, the battery cartridges are cooled to 44° C.

It can also be seen that, when the height of the clearances h1 or h2 is increased to 6 mm, the temperature of the battery cartridges is increased to 45° C. At 7 mm, the temperature of the battery cartridges again becomes 44° C. At 8 mm, the battery cartridges are cooled to about 45.5° C. That is, it can be seen that, although effective cooling effects are obtained in accordance with an increase in the height of the clearances, a reduction in cooling effects occurs at 8 mm because the stacking space of the stacked battery cartridges is limited in terms of volume and structure.

FIG. 13 depicts experimental result values representing a temperature difference of the battery cartridges depending upon the height of the clearances h1 or h2 when the battery cartridges have different initial temperatures.

When the battery cartridges have various temperature distributions with an average temperature of 55° C., they are cooled in accordance with cooling operation of air flowing through the clearances h1 or h2. In this case, when the height of the clearance h1 or h2 between the battery cartridges is 2 mm, a temperature difference averaging about 3.75° C. is generated. At 3 mm, a temperature difference averaging about 3.4° C. is generated.

As the height of the clearance h1 or h2 increases to 5 mm, a temperature difference averaging about 2.1° C. is generated. It can also be seen that, when the height of the clearance h1 or h2 further increases, a smaller temperature difference than the above-described temperature difference is generated on average. That is, it can be seen that the condition providing uniform cooling effects is no longer established. It can be seen that, at 5 mm or more, the battery cartridges have a uniform temperature difference exhibiting a minimum average temperature difference.

Meanwhile, at heights exceeding 8 mm, there is no particular difference than at heights exceeding 8 mm in that the stacking structure of the battery cartridges or the space occupied by the battery cartridges is limited. The clearance, which has a height of less than 8 mm, provides optimum cooling effects.

When the clearances h1 or h2 exceed 8 mm, there is waste of space in that, when the battery cartridges are stacked under the condition that the height of the clearances h1 or h2 increases, the space occupied by the stacked battery cartridges is undesirably increased. Also, referring to FIG. 12, the average temperature of the battery cartridges cooled at the height exceeding 8 mm exhibits reduced cooling effects, as compared to the average temperature of the battery cartridges cooled at 8 mm. Thus, it can be seen that the height of 8 mm or less provides optimum cooling effects.

Figure 14:
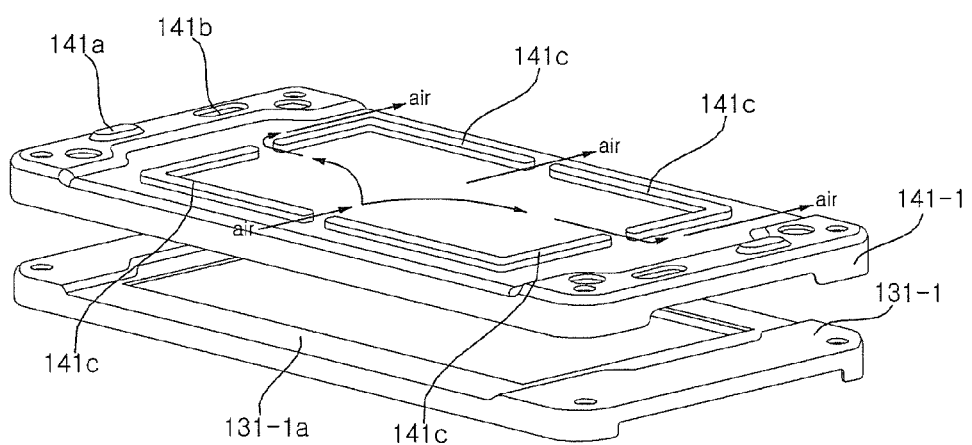
FIG. 14 is a view illustrating various embodiments associated with the shape of ventilation ridges.

FIGS. 6 and 14 are views illustrating various embodiments associated with the shape of the ventilation ridges 141c.

First, the embodiment of the ventilation ridges 141c shown in FIG. 6 will be described. A plurality of ventilation ridges 141c is formed to protrude in parallel from the outer surface of the cover 141-1/141-2. When the facing ventilation ridges 141c contact each other, a parallel clearance h1 or h2 is formed. When the ventilation ridges 141c of the lower cover 141-2 in the upper-layer battery cartridge contact the ventilation ridges 141c of the upper cover 141-1 in the lower-layer battery cartridge, passages, through which air flows, are defined between the ventilation ridges 141c contacting each other while extending in parallel, as shown in FIG. 6. As air flowing through the clearance h1 or h2 flows along the passage defined by the contacting ventilation ridges 141c, the battery cartridge is air-cooled.

Also, as shown in FIG. 14, a part of the ventilation ridges 141c may be bent. The illustrated ventilation ridges 141c, which are bent, define passages, through which air flows, in accordance with contact of the facing ventilation ridges 141c. Parallel ventilation ridges 141c not shown may be further formed among the bent ventilation ridges 141c.

Although not shown, streamlined ventilation ridges may be formed as another embodiment of the ventilation ridges 141c. When facing streamlined ventilation ridges contact each other, streamlined air-flow passages may be defined.

In addition, the ventilation ridges of the above-described embodiments may be provided in a mixed state. In this case, facing ventilation ridges define air-flow passages. Accordingly, air cools the battery cartridges while passing through the above-described passages.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery cartridge comprising:
    four unit cells for generating current and including first to fourth unit cells, wherein the first unit cell and the second unit cell are coupled in a close contact state, the third unit cell and the fourth unit cell are coupled in a close contact state, and a gap is formed between the second unit cell and the third unit cell, wherein each of the unit cells has a sealing portion provided at edges around the unit cell;
    an inner cartridge member receiving the four unit cells and interposed between the second unit cell and the third unit cell to form the gap, wherein the central cartridge member has a plurality of side holes;
    an upper cover coupled to the central cartridge member;
    an upper cartridge member coupled to the central cartridge member, interposed between the upper cover and the central cartridge member, and having an upper contact surface contacting the sealing portion of the first unit cell;
    a lower cover coupled to the central cartridge member;
    a lower cartridge member coupled to the central cartridge member, interposed between the lower cover and the central cartridge member, and having a lower contact surface contacting the sealing portion of the fourth unit cell; and
    a plurality of cartridge supports inserted into the side holes, and disposed between the sealing portions of the first unit cell and the second unit cell to contact the sealing portions of the first unit cell and the second unit cell, and between the sealing portions of the third unit cell and the fourth unit cell to contact the sealing portions of the third unit cell and the fourth unit cell,
    wherein the upper cover contacts the upper contact surface of the upper inner cartridge member and contacts a top surface of the first unit cell except the sealing portion of the first unit cell,
    wherein the lower cover contacts the lower contact surface of the lower inner cartridge member and contacts a bottom surface of the fourth unit cell except the sealing portion of the fourth unit cell.

2. The battery cartridge according to claim 1, further comprising:

a parallel positive electrode terminal arranged at a side of the plurality of unit cells to form an anode of the plurality of unit cells; and a parallel negative electrode terminal arranged at the side of the plurality of unit cells in parallel with the parallel positive electrode terminal to form a cathode of the plurality of unit cells.

3. The battery cartridge according to claim 1, wherein the central cartridge member has a central hole that forms the gap between the second unit cell and the third unit cell to cope with expansion of the unit cells.

4. The battery cartridge according to claim 1, wherein a pair of the unit cells is connected in parallel and two pairs of the parallel-connected unit cells are connected in series.

5. The battery cartridge according to claim 1, wherein the upper cover has convex portions and concave portions at four corners of the upper cover in a symmetrical manner and the lower cover has convex portions and concave portions at four corners of the lower cover in a symmetrical manner, wherein the upper cover and the lower cover have the same shape.

6. The battery cartridge according to claim 1, wherein the upper cover has an upper ventilation ridge protruded from the top surface, and the lower cover has a lower ventilation ridge protruded from the bottom surface.

7. The battery cartridge according to claim 6, wherein when at least two battery cartridges stacks, the upper ventilation ridge and the lower ventilation ridge contact and form a clearance between the battery cartridges.

8. The battery cartridge according to claim 7, wherein the clearance is about 5 to 8 mm.

9. The battery cartridge according to claim 7, wherein when at least two battery cartridges stacks, the convex portions of the upper cover couple to the concave portions of the lower cover and the concave portions of the upper cover couple to the convex portions of the lower cover to provide alignment of the stacked battery cartridges.

* * * * *